(12) United States Patent
Sundholm et al.

(10) Patent No.: US 7,140,381 B2
(45) Date of Patent: Nov. 28, 2006

(54) VALVE ELEMENT

(75) Inventors: Göran Sundholm, Tuusula (FI); Harry Metzger, Kerava (FI)

(73) Assignee: Marioff Corporation Oy, Vantaa (FI)

( * ) Notice: Subject to any disclaimer, the term of this patent is extended or adjusted under 35 U.S.C. 154(b) by 250 days.

(21) Appl. No.: 10/497,820

(22) PCT Filed: Jan. 16, 2003

(86) PCT No.: PCT/FI03/00029

§ 371 (c)(1),
(2), (4) Date: Jun. 7, 2004

(87) PCT Pub. No.: WO03/059454

PCT Pub. Date: Jul. 24, 2003

(65) Prior Publication Data

US 2005/0072463 A1    Apr. 7, 2005

(30) Foreign Application Priority Data

Jan. 17, 2002   (FI)   ................................. 20020090

(51) Int. Cl.
*F16K 17/40* (2006.01)
*A62C 35/68* (2006.01)
(52) U.S. Cl. ...................... 137/68.3; 137/68.13; 169/11
(58) Field of Classification Search ............. 137/68.13, 137/68.3; 222/5; 169/11, 28
See application file for complete search history.

(56) References Cited

U.S. PATENT DOCUMENTS

| | | | | |
|---|---|---|---|---|
| 1,762,806 A | * | 6/1930 | Allen et al. | 137/68.3 |
| 1,993,697 A | * | 3/1935 | Allen et al. | 137/68.3 |
| 2,059,189 A | * | 11/1936 | Allen | 137/68.3 |
| 2,441,011 A | * | 5/1948 | Dodelin | 137/68.13 |
| 2,515,068 A | * | 7/1950 | Young | 137/68.3 |
| 2,661,804 A | * | 12/1953 | Haessler | 137/68.13 |
| 2,972,998 A | * | 2/1961 | Detwiler | 137/68.13 |
| 3,101,733 A | * | 8/1963 | Lord | 137/68.13 |
| 3,326,226 A | * | 6/1967 | Hinton | 137/68.3 |
| 3,633,596 A | * | 1/1972 | Gerber | 137/68.3 |
| 4,006,780 A | | 2/1977 | Zehr | |
| 5,495,865 A | | 3/1996 | Wass et al. | |

FOREIGN PATENT DOCUMENTS

DE    2635076    2/1978

* cited by examiner

*Primary Examiner*—John Rivell
(74) *Attorney, Agent, or Firm*—Ladas & Parry LLP

(57) ABSTRACT

A valve element (20), comprising a frame (21), at least one first inlet (26), at least one second inlet (27) and at least one outlet (28). The valve element consists of a combination comprising at least one burst disk (23) or equivalent, which, when unbroken, closes a passage from the second inlet (27) at least to the outlet (28), and a piston element (25) comprising a piercing element (24) or the like for piercing the burst disk, said piston element being arranged to be movable between at least two positions when the burst disk has been pierced, in which first position the passage from the second inlet (27) to the outlet (28) is closed while in a second position the passage from the second inlet (27) to the outlet (28) is open, to which second position the piston element is moved after the pressure difference between the second inlet and the first inlet has reached a predetermined value.

15 Claims, 2 Drawing Sheets

VALVE ELEMENT

BACKGROUND OF THE INVENTION

The present invention relates to a valve element as defined in the pre-amble of claim 1, which comprises a frame, at least one first inlet, at least one second inlet and at least one outlet.

The invention relates to so-called delay valves used in pressure medium systems to open a passage upon being triggered after a pressure difference has reached a pre-set value. As is known, such valves are rather complicated and, especially in the case of gaseous pressure mediums, problems have been encountered in respect of tightness. On the other hand, in applications where the valve elements may remain unused for very long times, e.g. in connection with fire extinguishing systems, reliable operation of the valve elements is also an important design factor.

The object of the present invention is to achieve a completely new type of solution that makes it possible to avoid the drawbacks of prior art. The object of the invention is to create a reliable apparatus that can be utilized especially in fire extinguishing applications.

The valve element of the invention is characterized by a combination comprising at least one burst disk (rupture disk) or equivalent, which, when unbroken, closes a passage from the second inlet at least to the outlet, and a piston element comprising a piercing element or the like for piercing the burst disk, said piston element being arranged to be movable between at least two positions when the burst disk has been pierced, in which first position the passage from the second inlet to the outlet is closed while in the second position the passage from the second inlet to the outlet is open, to which second position the piston element is moved after the pressure difference between the second inlet and the first inlet has reached a predetermined value.

The apparatus of the invention is additionally characterized by what is stated in claims 2–6.

The solution of the invention has numerous significant advantages. By using in the valve element a combination comprising a burst disk and a movable piston element that simultaneously acts as a valve stem, a tight delay valve solution that is reliable when triggered is achieved. The solution is very well applicable for use in high-pressure systems, e.g. in high-pressure extinguishing systems using water mist.

BRIEF DESCRIPTION OF THE FIGURES

In the following, the invention will be described in more detail by the aid of en example with reference to the attached drawing, wherein.

DETAILED DESCRIPTION OF THE INVENTION

Figure 1:
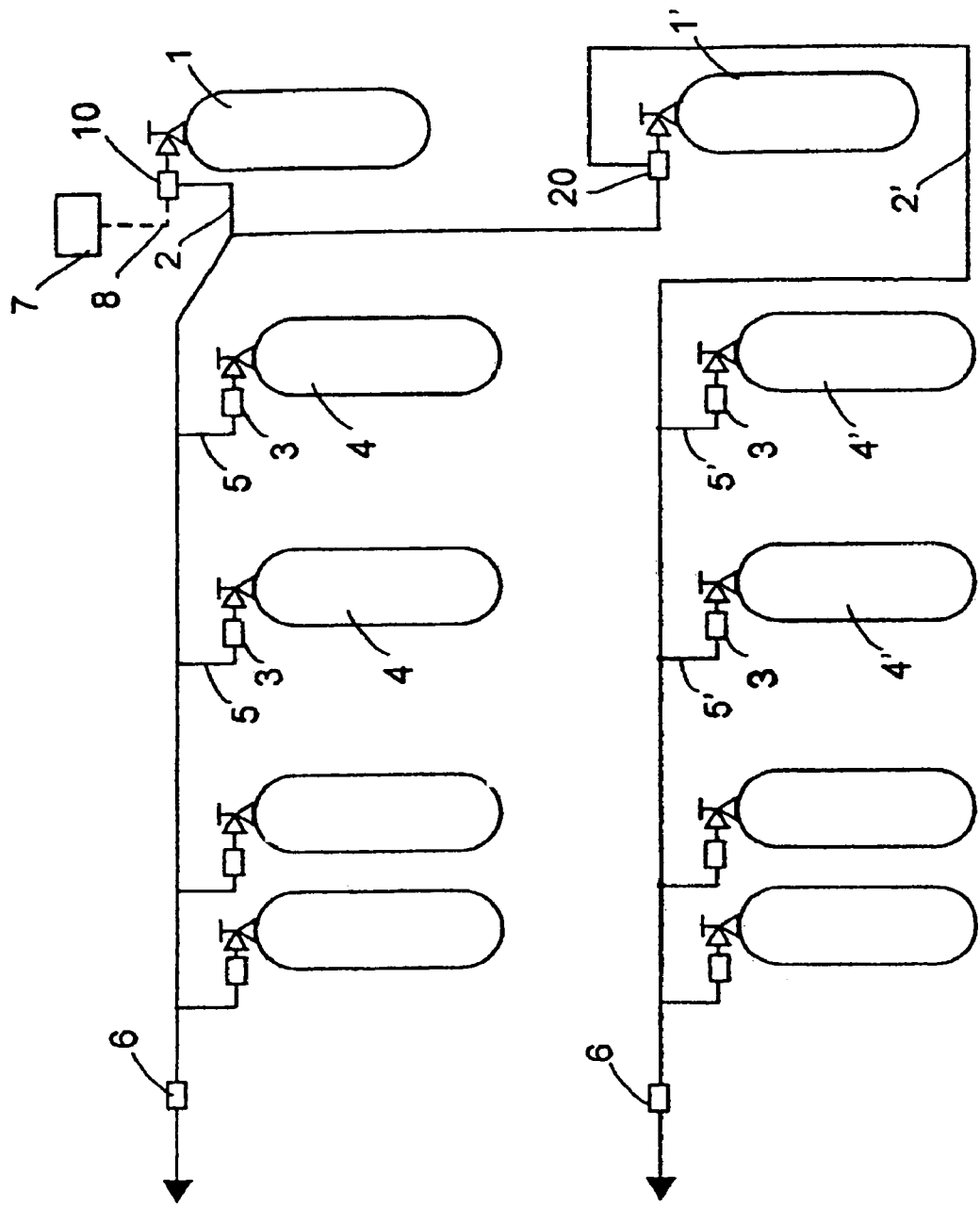
FIG. 1 presents an embodiment of the apparatus of the invention.

The valve element 20 of the invention comprises a frame 21 having at least one first inlet 26, at least one second inlet 27 and at least one outlet 28. Provided in the frame of the valve element of the invention is a combination comprising at least one burst disk 23 (rupture disk) or equivalent, which, when unbroken, closes the passage from the second inlet 27 at least to the outlet 28, and a piston element 25 comprising a piercing element 24 or the like for piercing the burst disk, said piston element being arranged to be movable between at least two positions when the burst disk has been pierced, in which first position the passage from the second inlet 27 to the outlet 28 is closed while in the second position the passage from the second inlet to the outlet is open, into which second position the piston element is moved when the pressure difference between the second inlet and the first inlet has reached a predetermined value.

Figure 2:
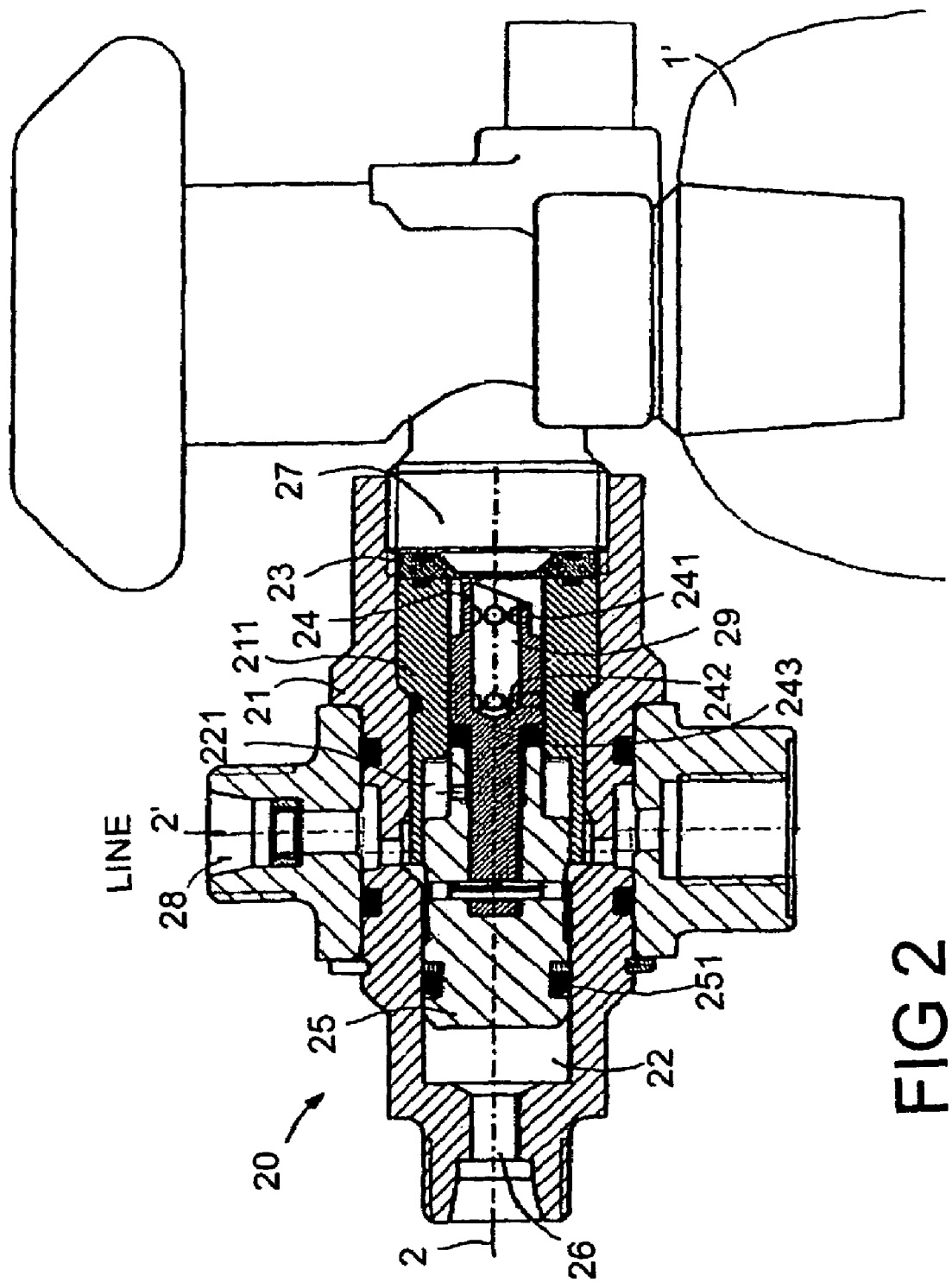
FIG. 2 presents a valve element according to the invention.

A valve element 20 according to the invention is presented in FIG. 2. The device is a so-called delay valve, which opens a passage from a pressure medium source 1' to line 2' when the pressure difference between the line 2 used for triggering and the pressure medium source 1' has risen to a sufficiently high level (i.e. in practice after the pressure in line 2 has fallen to a predetermined value). The device comprises a frame 21 provided with a first inlet 26 at its first end for connecting to the triggering line 2 and a second Inlet 27 for connecting to the pressure medium source 1', preferably at the second end. The frame is provided with an outlet 28, connecting e.g. to line 2'. The frame is provided with a burst disk, which, when unbroken, closes the passage between the second inlet and the outlet. The frame comprises a cylinder chamber 22 with a piston element 25 fitted in it. The cylinder space communicates with the first inlet 22. The piston element is provided with a piercing element 24, preferably on the piston rod, at the end pointing towards the burst disk. The piston element is provided with a bore 29 preferably formed in the piston rod so that it extends through some distance from the piercing element in the axial direction of the piston element. The piston rod is provided with at least one aperture 242 extending from the bore and opening at a lateral surface of the piston rod of the piston element. The piercing element can be provided with at least one aperture 241. A sealing element 243, preferably a sealing ring is provided on the piston rod at some axial distance from the piercer, said sealing element substantially tightening the joint between the piston rod and the sliding surface of the sleeve. The piston rod of the piston element is provided with a sealing element 243, preferably a sealing ring, placed at some axial distance from the piercer, and the piston element is provided with another sealing element 251. The piston element and the piercing element provided in combination with it can be moved axially in the cylinder space 22 between at least three positions. FIG. 2 shows a first position, where the piercing element remains on the outlet 28 side of the burst disk. In a second position, the piercing element has at least partially pierced the burst disk, in which situation the pressure medium coming from the pressure medium source 1' can exert a pressure via the hole formed in the burst disk 23 on the cross-sectional area of the piston element on the side facing towards the piercing element 24. As the pressure of the pressure medium prevailing in the cylinder space 22 communicating with the first inlet 26 acts on the first cross-sectional area of the piston element, which in the case of FIG. 2 is larger than its cross-sectional area on the side facing towards the piercing element, with a predetermined pressure, the passage from the second inlet to the outlet is not yet opened. In a third position, in the case illustrated by the figure, the piston-piercing element combination moves further towards the first inlet 26, so that, when the sealing 242 on the piston rod of the piston element is no longer pressed against the sealing surface of the sleeve 211, at least one passage is opened between the second inlet 27 and the outlet 28. In the case of FIG. 2, the pressure medium is admitted through the bore 29 in the rod part of the piston element and at least one other aperture 242 into that part 221 of the cylinder space 22 which communicates with the outlet 28. In the embodiment presented in the figure, the outlet 28 is disposed between the first and the second inlets.

FIG. 1 is a diagrammatic representation of a pressure system in which the valve element of the invention can be utilized. The system comprises at least two pressure sources 4, 4', preferably connected in parallel, which in the solution presented in the figure consist of four pressure containers 4, 4' each. In addition, the system comprises at least one first pressure source 1 and means for opening a connecting passage from the first pressure source 1 to a pressure network 2, which communicates with a first pressure source 4. The means for opening a connecting passage comprise a first valve element 10, which is disposed between the first pressure source 1 and the pressure network 2. When the first valve element 10 is opened, e.g. triggered by a control system 7 or manually, the pressure in the network 2 rises. This has the effect of opening second valve elements 3, which are disposed at least in the passage 5 between the first pressure source 4 and the network 2. After the pressure in the network 2 has risen to a sufficient level, a third valve element 6 will be opened at a pre-set pressure.

As the pressure in the network 2 is rising, a passage is opened from a second pressure source 1' to a fourth valve element 20. This keeps the connection to the second branch 2' of the pressure network closed until the pressure in the first pressure network 2 has fallen to a predetermined value. In that situation, the pressure in the first pressure network 2 has fallen to a predetermined value. After this, the pressure in the second network 2' rises, with the result that valve elements 3 connected to at least one second pressure source 4' open a passage 5' into the second pressure network 2'. The third valve element 6 is not opened until the pressure in the second pressure network 2' has reached a predetermined value.

The burst disk is preferably designed to withstand high pressures and pressure differences. The active pressures are typically over 30 bar, preferably over 70 bar. The pressures may even be as high as 300 bar. The burst disk preferably comprises a thinner part in the area to which the action of the piercing element is applied in the triggering situation.

The valve element may be the closing valve of a second pressure source, which is opened by a pressure impulse received from a first pressure source. The valve is especially a so-called delay valve. The valve element is typically used in a fire extinguishing system.

Valve elements according to the invention can be applied especially in connection with fire extinguishing systems, especially in connection with a fire extinguishing apparatus using high-pressure water mist. The pressure medium may consist of gas, liquid or a mixture of gas and liquid.

It is obvious to the person skilled in the art that the invention is not limited to the embodiments described above, but that it may be varied within the scope of the claims presented below.

The invention claimed is:

1. In a valve element (20) comprising a frame (21), at least one first inlet (26), at least one second inlet (27), at least one outlet (28), at least one burst or rupture disk (23) which, when unbroken, closes a passage from the second inlet (27) at least to the outlet (28), and a piston element (25) comprising a piercing element (24) for piercing the burst or rupture disk, the improvements comprising:

said piston element being movable between at least first and second positions when the burst or rupture disk has been pierced, in the first position the passage from the second inlet (27) to the outlet (28) being closed while in the second position the passage from the second inlet (27) to the outlet (28) is open; and the piston element being moved to the second position after a pressure difference between the second inlet and the first inlet is has reached a predetermined value.

2. Valve element according to claim 1, characterized in that the piston element is provided with a bore (29) preferably formed in the piston rod so that it extends through some distance from the piercing element in the axial direction of the piston element, at least one aperture (242) being provided in the piston rod, leading out from said bore and opening at a lateral surface of the piston rod of the piston element.

3. Valve element according to claim 1, characterized in that the piston rod of the piston element is provided with a sealing element (243), preferably a sealing ring, placed at some axial distance from the piercer, and the piston element is provided with another sealing element (251).

4. Valve element according to claim 1, characterized in that the valve element is the closing valve of a second pressure source and that it is opened by a pressure impulse received from a first pressure source.

5. Valve element according to claim 1, characterized in that the valve element is a delay valve.

6. In a fire extinguishing system, the improvement of a valve element according to claim 1.

7. Valve element according to claim 2, characterized in that the piston rod of the piston element is provided with a sealing element (243), preferably a sealing ring, placed at some axial distance from the piercer, and the piston element is provided with another sealing element (251).

8. Valve element according to claim 2, characterized in that the valve element is the closing valve of a second pressure source and that it is opened by a pressure impulse received from a first pressure source.

9. Valve element according to claim 3, characterized in that the valve element is the closing valve of a second pressure source and that it is opened by a pressure impulse received from a first pressure source.

10. Valve element according to claim 2, characterized in that the valve element is a delay valve.

11. Valve element according to claim 3, characterized in that the valve element is a delay valve.

12. Valve element according to claim 4, characterized in that the valve element is a delay valve.

13. In a fire extinguishing system, the improvement of a valve element according to claim 2.

14. In a fire extinguishing system, the improvement of a valve element according to claim 3.

15. In a fire extinguishing system, the improvement of a valve element according to claim 4.

* * * * *